US007446705B1

(12) United States Patent
Feigl et al.

(10) Patent No.: US 7,446,705 B1
(45) Date of Patent: Nov. 4, 2008

(54) METHOD AND APPARATUS FOR DETERMINING PARAMETERS FOR A PARAMETRIC EXPRESSION CHARACTERIZING THE PHASE OF AN ACQUIRED SIGNAL

(75) Inventors: Kurt L. Feigl, Madison, WI (US); Clifford H. Thurber, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 11/877,779

(22) Filed: Oct. 24, 2007

(51) Int. Cl.
*G01S 1/02* (2006.01)
(52) U.S. Cl. ............................ 342/357.12; 342/357.15
(58) Field of Classification Search ............ 342/357.02, 342/357.06, 357.09, 357.12, 357.13, 357.15; 701/207, 213, 215
See application file for complete search history.

(56) References Cited

U.S. PATENT DOCUMENTS

| 4,809,005 | A * | 2/1989 | Counselman, III | ........ 342/352 |
| 2002/0008661 | A1 * | 1/2002 | McCall et al. | ......... 342/357.14 |
| 2007/0257831 | A1 * | 11/2007 | Mathews et al. | ............. 342/22 |

OTHER PUBLICATIONS

Colesanti, C., Ferretti, A., Prati, C., Perissin, D., & Rocca, F., Ers-Envisat Permanent Scatterers Interferometry, 2003, pp. 1130-1132, IEEE.
Ferretti, A., Prati, C., & Rocca, F., Nonlinear Subsidence Rate Estimation Using Permanent Scatterers in Differential SAR Interferometry, IEEE Transactions on Geoscience and Remote Sensing, Sep. 2000, pp. 2202-2212, vol. 38, No. 5.
Ferretti, A., Prati, C., & Rocca, F., Permanent Scatterers in SAR Interferometry, IEE Transactions on Geoscience and Remote Sensing, Jan. 2001, pp. 8-20, vol. 39, No. 1.
Leick, A., GPS Satellite Surveying, Third Edition, pp. 170-181, John Wiley & Sons, Inc., 2003.
Mardia, K.V., Statistics of Directional Data, 1972, pp. 18-33, Academic Press, London and New York.
Mardia, K.V. & Jupp, P.E., Directional Statistics, pp. 12-23, John Wiley & Sons Ltd., 1999.
Massonnet, D. & Feigl, K., Radar Interferometry and Its Application to Changes in the Earth's Surface, Reviews of Geophysics, Nov. 1998, pp. 441-500, vol. 36, No. 4.
Nikolaidis, N. & Pitas, I., Nonlinear Processing and Analysis of Angular Signals, IEEE Transactions on Signal Processing, Dec. 1998, pp. 3181-3194, vol. 46, No. 12.
Shumway, R., Applied Statistical Time Series Analysis, pp. 62-69, Prentice Hall, Englewood Cliffs, NJ, 1988.
Vadon, H. & Sigmundsson, F., Crustal Deformation from 1992 to 1995 at the Mid-Atlantic Ridge, Southwest Island, Mapped by Satellite Radar Interferometry, Science Magazine, Jan. 10, 1997, pp. 194-197, vol. 275, No. 5297.

* cited by examiner

*Primary Examiner*—Dao L Phan
(74) *Attorney, Agent, or Firm*—Boyle Fredrickson S.C.

(57) ABSTRACT

A method and apparatus have been developed to model wrapped phase data directly. An average statistical cost measures the misfit between the observed phase value modeled phase value. A set of acceptable values for the parameters in a parametric expression characterizing the wrapped phase is found by searching for an average statistical cost below a threshold. In the context of interferometry, the parameter values can then be used to determine the impact of a geophysical event on a geographic area. In the context of a global navigation satellite system (GNSS), such as the Global Positioning System (GPS), the values can be used to determine the position of a GNSS receiver.

24 Claims, 8 Drawing Sheets

METHOD AND APPARATUS FOR DETERMINING PARAMETERS FOR A PARAMETRIC EXPRESSION CHARACTERIZING THE PHASE OF AN ACQUIRED SIGNAL

FIELD OF THE INVENTION

The present invention is directed to a method and apparatus for determining parameters for a parametric expression characterizing the phase of an acquired signal. The invention is believed to be particularly applicable for determining the position of a receiver recording signals transmitted by the Global Positioning System (GPS), a subset of the Global Navigation Satellite System (GNSS), and for determining the impact of a geophysical event on a geographic region from interferometric analysis of images acquired by Synthetic Aperture Radar (INSAR).

BACKGROUND OF THE INVENTION

It is well known that an electromagnetic signal generally can be expressed as two components—amplitude and phase. Highly complex and sophisticated processing techniques have been developed to extract information from the amplitude and phase of such a signal.

Synthetic Aperture Radar (SAR) is one such technique. It is an active remote sensing technique that utilizes radar satellite images and sophisticated post-processing. Unlike passive sensing, SAR involves the transmission of electromagnetic radiation as a wave from a source toward a target, which, in turn, reflects radiation back toward the source. The reflected radiation returns as a signal that can analyzed in terms of its amplitude components and its phase components. For many SAR systems, only the amplitude data of the return signal is used to extract information; however, increasingly, the phase components of the return signal are being used to enhance the information extracted from the return signal.

Interferometry is a technique that compares the phase and amplitude of two waves. Interferometric SAR (InSAR) is a technique that uses two images of the same area, such as a geographic region, and generates an interferogram from the difference in phase between the two images. The phase difference is measured and is recorded as repeating fringes. For many quantitative applications, the fringes present in the interferogram must be "unwrapped". Typically, this involves counting the integer number of fringes, which correspond to an integer number of wavelengths, to produce a field of displacement along the "line of sight" between the radar antenna and the ground pixel. The unwrapped interferogram may then be further analyzed, interpreted, and modeled to characterize geophysical changes of the geographic region.

More particularly, InSAR is a geodetic technique that calculates the interference pattern caused by the difference in phase between two images acquired by a space-borne or airborne SAR at two distinct times. The resulting interferogram is a contour map of the change in distance between the ground and the radar instrument. These maps provide an unsurpassed spatial sampling density (of the order of 100 pixels per square kilometer), a competitive precision (of the order of 10 millimeters) and a useful observation cadence (of the order of 1 pass per month). This remote-sensing tool has been demonstrated and validated for many actively deforming areas, including natural earthquakes and anthropogenic activity.

Each time a radar sensor acquires an image, it records, for each pixel, a complex number composed of an amplitude and a phase. The amplitude measures the backscatter or the intensity of electromagnetic radiation reflected by the ground back to the radar antenna. The phase provides a measurement of the round trip travel time (and thus the distance) between the satellite and the ground. Given two such complex images acquired at two distinct times, InSAR provides four data products: two amplitude images, a map of the phase shift (called an interferogram), and a map of the spatial coherence (the degree of resemblance in the phase shift between neighboring pixels). All four of these maps are typically registered to a digital elevation model (DEM) in geographic or cartographic coordinates within a distance of the order of 10 meters.

The InSAR phase values range from $-\frac{1}{2}$ to $+\frac{1}{2}$ cycles. The phase values are generally ambiguous because they are determined only to within an unknown integer number of cycles. Accordingly, the phase values are typically referred to as "wrapped" phase values. To interpret the wrapped values in terms of range change in millimeters, however, conventional InSAR resolves the integer ambiguities in a process known as "unwrapping". Unwrapping algorithms have been developed, but these algorithms can break down in areas where the phase is noisy as a result of decorrelation, leading to significant errors in the unwrapped phase data. Few, if any, of these unwrapping algorithms provide an estimate of the uncertainty of their output, preventing any attempt to weight the data in a statistical analysis.

A Global Navigation Satellite System (GNSS) receiver is an example of a device that can use the amplitude and phase components of an electromagnetic signal to determine a position relative to a global coordinate system. Generally, the GNSS is composed of a constellation of orbital satellites capable of communicating with GNSS receivers. The Global Positioning System (GPS) operated by the U.S. government is a subset of the GNSS. A GNSS receiver typically includes software and a user interface designed to determine the position of the GNSS receiver from signals received by the orbital satellites. Generally, each satellite generates signals at one or more frequencies. Each signal is detected and stored by the GNSS receiver for processing, such as by the GNSS receiver or other processors, such as a computer workstation, communicatively linked to the GNSS receiver. More particularly, the GNSS receiver stores data consisting of recordings of the signals transmitted by the satellites.

The GNSS receiver will receive signals from at least four separate orbiting satellites to estimate at least four unknown parameters that define the position of the GNSS receiver. Those parameters include latitude, longitude, elevation, and time. Each satellite can provide several types of signals, including an absolute but imprecise distance called a pseudorange as well as an ambiguous (wrapped) but precise phase measurement. Either observable quantity can be converted to a distance measurement that can be used to estimate the position of the GNSS receiver in a process known as trilateration.

In current practice, to use the more precise phase measurements, the GNSS positioning device must first unwrap the wrapped phase. In the context of GNSS processing, this is commonly referred to as "bias fixing", "resolving integer ambiguities", or "fixing cycle-slips". As in the InSAR example described above, the unwrapping procedure requires significant computing power. Consequently, most consumer-grade GNSS receivers, such as hand-held GPS receivers and vehicle-mounted GPS receivers, use pseudorange measurements, rather than phase measurements, as data to estimate values for the unknown parameters. In this regard, typical consumer-grade GNSS receivers using pseudorange data alone will provide a positional precision of 1 to 10 meters, whereas phase measurements, when properly unwrapped, can yield a positional precision better than 1 meter.

BRIEF DESCRIPTION OF THE INVENTION

The present inventors have recognized that drawbacks associated with unwrapping of wrapped phase data may be avoided by modeling the phase data directly. In the context of GNSS receivers, this recognition allows consumer-grade GNSS receivers to be developed that provide the precision associated with phase measurements yet avoid the complexity required for bias fixing or phase unwrapping. Similarly, the present invention overcomes the drawbacks associated with phase unwrapping for InSAR and other imaging processes.

Therefore, in accordance with one aspect, the present invention is directed to a method that includes (a) acquiring a plurality of signals, each having a phase component, herein called an "observed phase value", characterized by a parametric model expression, the parametric model expression defined by a set of parameters of unknown value, (b) establishing a set of values for the parameters, (c) determining a modeled phase value for each of the phase components by evaluating the parametric expression, (d) determining an average statistical cost for the set of parameter values as a function of the residual difference between the observed value and the modeled value of each of the phase components, averaged over the plurality of signals, (e) repeating (b)-(d) until finding an average statistical cost that is less than a predefined threshold, (f) conveying those values for the parameters corresponding to the parametric expression that provides the desired value of average statistical cost, (g) conveying the modeled value for each of the phase components corresponding to the parameter values that provide the desired value of average statistical cost, and (h) conveying an unwrapped version of the observed value for each of the phase components.

In accordance with another aspect, the present invention is directed to a Global Navigation Satellite System (GNSS) device comprising a receiver, a display, and a processor. The processor is adapted to execute a set of instructions that cause the processor to (a) determine the observed phase values of a plurality of GNSS signals acquired by the receiver, (b) establish a set of values for the parameters from a combination of user input values and stored values, (c) access a stored parametric expression for the phase component, the parametric expression defined by the set of parameters, (d) calculate a modeled value for each of the phase components from the parametric expression, (e) calculate a statistical cost of the set of parameter values as a function of the difference between the established value and modeled value for each of the phase components, averaged over the plurality of signals, (f) repeat (b)-(e) until finding an average statistical cost that is less than a predefined threshold, and (g) display an acceptable set of parameter values corresponding to the average statistical cost that is less than the predefined threshold on the display of the GNSS device.

According to another aspect, the present invention is directed to a computer-readable storage medium having a set of instructions stored thereon that when executed by a processor causes the processor to (a) determine a phase component for each of a plurality of acquired signals, (b) establish values for the set of parameters from a combination of user input values and stored values; (c) access a stored parametric expression for the phase component, the parametric expression defined by a set of parameters, (d) calculate a modeled value for each of the phase components from the parametric expression, (e) calculate a cost of the set of parameter values as the residual difference between observed values and modeled values of each of the phase components averaged over the plurality of signals, (f) repeat (b)-(e) until finding an average statistical cost that is less than a predefined threshold, (g) convey parameter values corresponding to the acceptable average statistical cost, (h) convey a modeled value for each of the phase components corresponding to acceptable average statistical cost, and (i) convey an unwrapped version of the observed value for each of the phase components.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION

The present invention is directed to a technique, and hardware/software/firmware for carrying out such a technique, in which the wrapped phase of a signal is modeled directly rather than unwrapped and then modeled. In this regard, the invention is believed to be applicable to a number of applications in which it has heretofore been desirable or otherwise necessary to unwrap wrapped phase. For purposes of illustration, two exemplary applications will be described, but it is understood that the invention is not limited to these two applications and therefore may be extended to other applications not specifically described herein.

Figure 1:
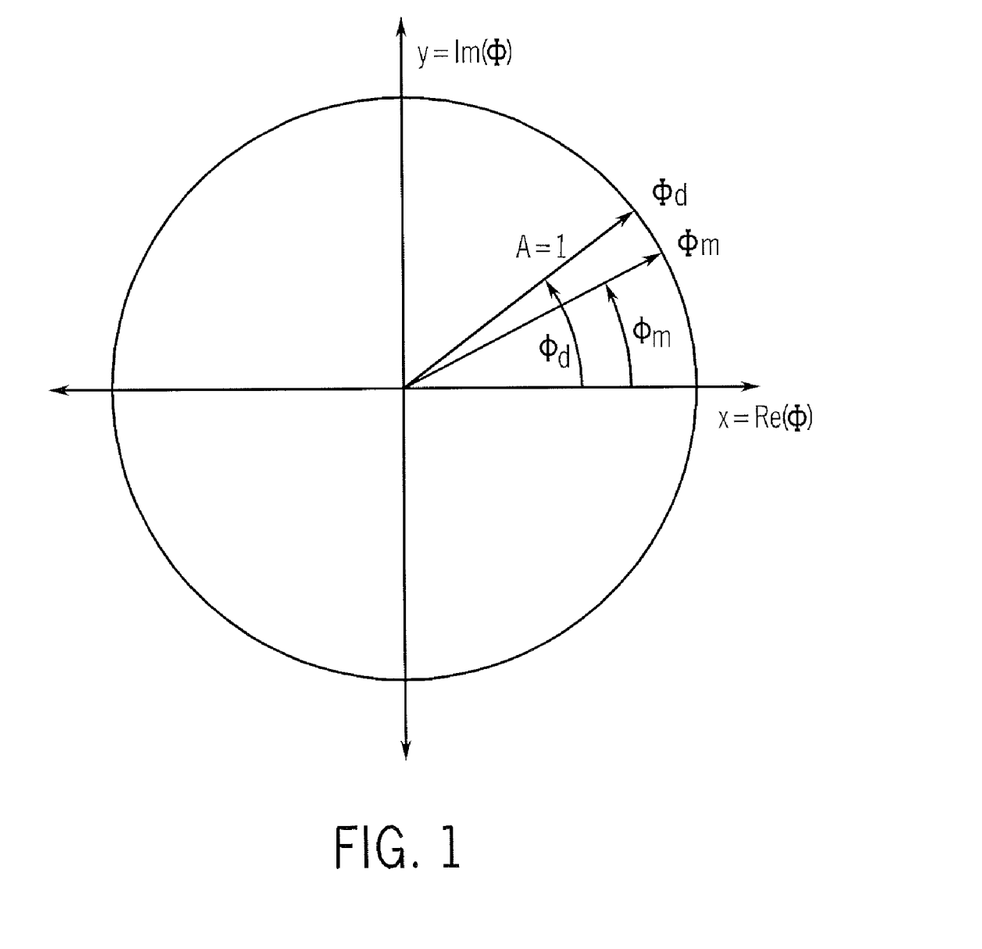
FIG. 1 is a phasor representation of a data phasor and a model phasor.

As referenced above, in general, the present invention includes a method of modeling wrapped phase directly thereby avoiding the pitfalls generally associated with unwrapping wrapped phase data. In this regard, a data set of n known, measured, or observed or phase values $\vec{\Phi}_d$ in cycles, can be expressed as phasors with unit length (amplitude) as shown in FIG. 1:

$$\vec{\Phi}_d = \begin{bmatrix} x_d \\ y_d \end{bmatrix} = \begin{bmatrix} \cos(\phi_d) \\ \sin(\phi_d) \end{bmatrix}. \qquad (1)$$

Similarly, the best-fitting modeled phase values $\vec{\Phi}_m$ may be expressed as:

$$\vec{\Phi}_m = \begin{bmatrix} x_m \\ y_m \end{bmatrix} = \begin{bmatrix} \cos(\phi_m) \\ \sin(\phi_m) \end{bmatrix}. \qquad (2)$$

The modeled phase $\phi_m$ is a function of the unknown parameters m:

$$\phi_m = f(m) \qquad (3).$$

The optimal values of the parameters m can be found by minimizing the cost function $$C = \frac{1}{n} \sum_{i=1}^{n} \cos^{-1}\{\vec{\Phi}_d \cdot \vec{\Phi}_m\}_i, \qquad (4)$$

where the "dot" indicates the inner (scalar) product and $\cos^{-1}$ is the inverse cosine function that returns a non-negative value in cycles. The cost function C may be interpreted geometrically as the $L_1$ norm of the phase angles between the data phasors $\vec{\Phi}_d$ and model phasors $\vec{\Phi}_m$. The cost function C ranges from 0.0 to 0.5 cycle.

As mathematically represented above, the modeled phase can be characterized by a parametric expression. In the context of geophysical mapping, for example, the parametric expression may define the mathematical relationship between various geophysical attributes that collectively define a geographic area. In the context of GNSS, the parametric expression may define the mathematical relationship between the phase components and the four unknown parameters of latitude, longitude, elevation, and time that are typically estimated to determine the location of a GNSS receiver. It is understood, however, that other parametric expressions may be developed with a conceptually unlimited number of parameters to characterize the phase of an acquired signal. Regardless of the number of parameters, the present invention, through an iterative process, determines acceptable values for each of the parameters in the parametric expression. In a preferred embodiment, a sufficient number of iterations are carried out until the average statistical cost reaches a global minimum; however, it is recognized that an average statistical cost less than a predetermined threshold value could be used to identify acceptable values for the parameters of the parametric expression.

Figure 2:
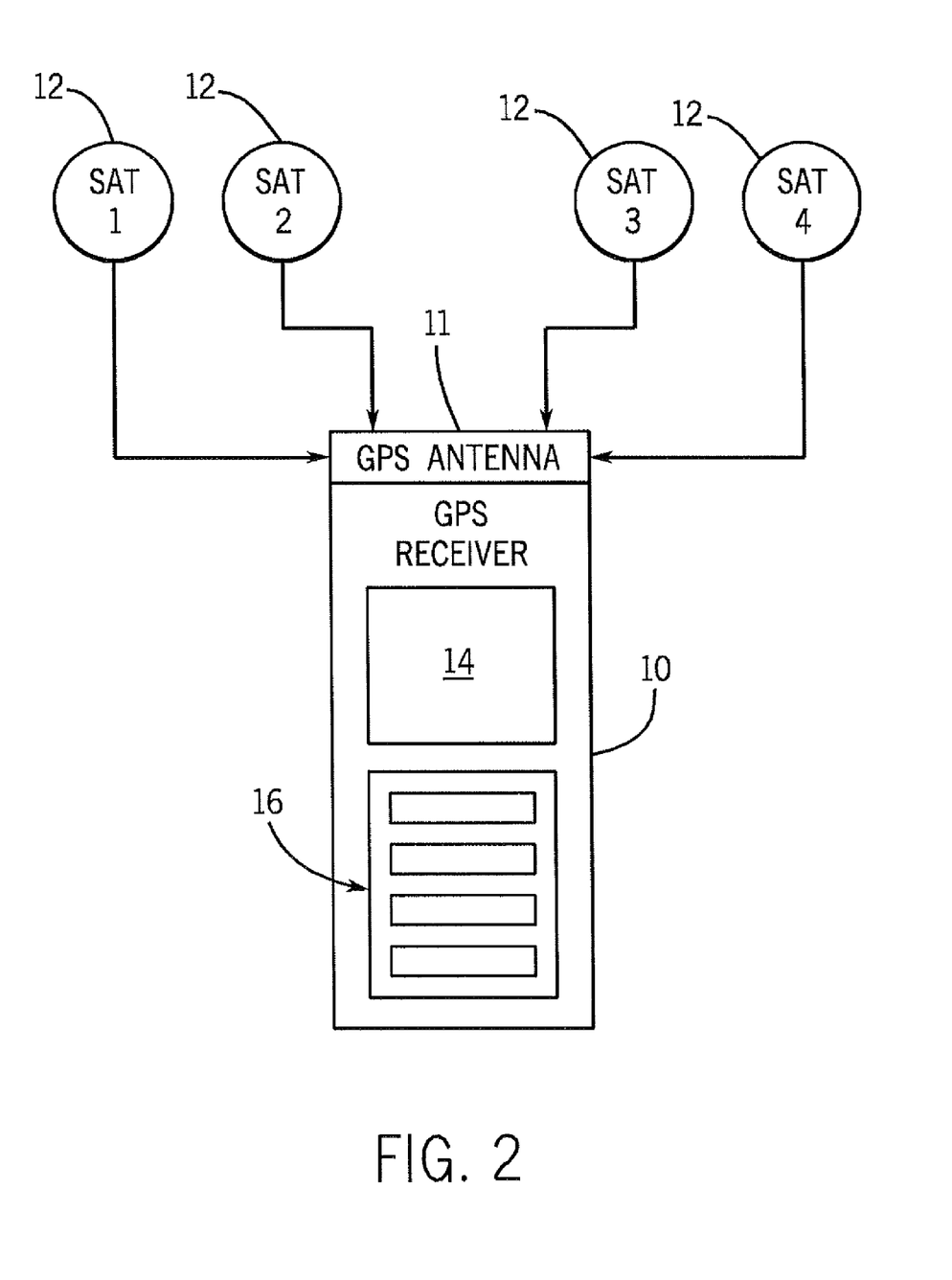
FIG. 2 is a schematic representation of a GNSS receiver adapted to communicate with an orbiting GNSS satellite.

Referring now to FIG. 2, the present invention may be used to estimate a position of a GNSS receiver 10 that communicates, via GNSS antenna 11, with orbiting GNSS satellites 12. To determine the position of the GNSS receiver 10, the GNSS receiver must receive GNSS signals from at least four separate GNSS satellites 12. Each GNSS satellite 12 provides a plurality of GNSS signals, including phase components that can be analyzed to determine the distance of the GNSS receiver 10 from the transmitting satellite 12. The GNSS receiver 10 includes software that determines the latitude, longitude, and elevation of the GNSS receiver 10 from the four separate GNSS signals. This coordinate information may then be displayed as numerical values on screen 14 of the GNSS receiver 10. The coordinate information may also be shown on the display of the GNSS receiver 10 relative to a map stored in memory of the GNSS receiver 10. The GNSS receiver 10 may also include an input interface 16 comprised of a keyboard or other buttons, for example, that allows a user to interact with the software of the GNSS receiver 10 to thereby control how information is displayed on the display screen 14.

Figure 3:
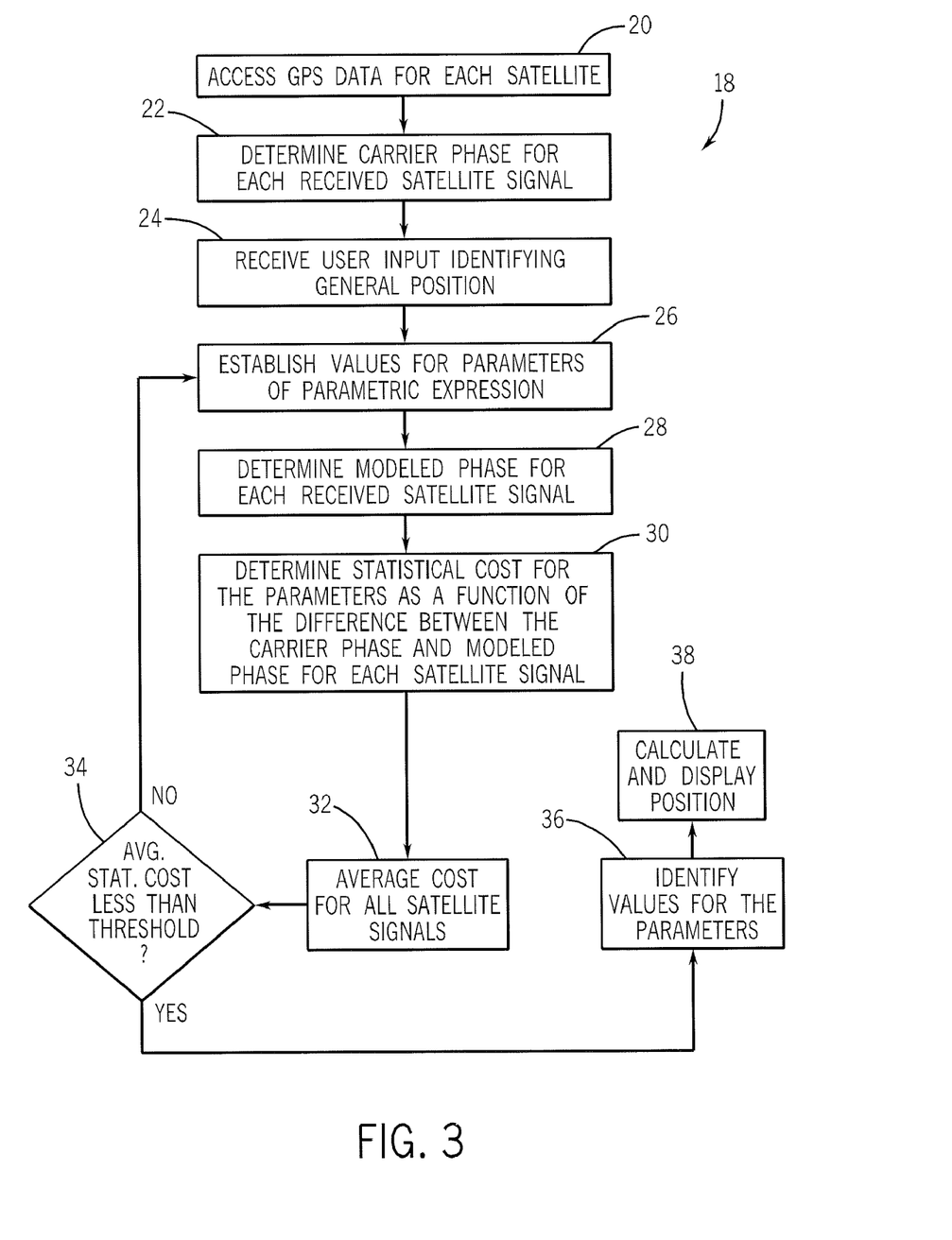
FIG. 3 is a flow chart setting forth the steps of determining the position of the GNSS receiver without unwrapping the phase in the GNSS signals received from the orbiting satellites of the GNSS constellation.

Referring now to FIG. 3, the process 18 of determining the position of the GNSS receiver 10 without phase unwrapping begins by accessing GNSS data acquired by the GNSS receiver 10 at block 20. The GNSS data may be stored locally on the GNSS receiver 10 or stored remotely in a computer workstation, for example. The GNSS data consist of the GNSS signals from each of the GNSS satellites 12 as recorded by the GNSS receiver 10. After the data are accessed, the phase of each GNSS recording is determined at block 22 in a known manner.

As noted above, the position of the GNSS receiver 10 can be characterized by a parametric expression. In the context of GNSS, those parameters include latitude, longitude, elevation, and time. In a preferred embodiment, the user is prompted at block 24 to provide general information regarding the position of the GNSS receiver 10. For example, the user could identify a city, state, or country. It is understood, however, that the position of the GNSS receiver could be determined without prompting the user to provide general position information. With the aid of the user input, if applicable, initial values for these parameters are determined at block 26. Using these initial values, process 18 determines the modeled phase for each GNSS recording at block 28. The statistical cost for the parameter values as a function of the residual difference between the modeled phase value and the observed phase value for each GNSS phase component is then determined at block 30. An average statistical cost is then calculated at block 32 collectively for the plurality of GNSS recordings. Specifically, the average statistical cost is determined by solving Equation 4. For example, for four GNSS recordings, Equation 4 sets n=4 and accounts for the angular phase difference between four pairs of phase values, each pair being composed of a measured phase and a modeled phase.

The process then continues to block 34 whereupon the average statistical cost is compared to a predetermined threshold value. If the average statistical cost is less than the threshold, the process continues to block 36 whereupon the values for the parameters that yielded the average statistical cost below the threshold are identified. The corresponding parameter information, describing the position of the GNSS receiver 10, is then output to the display 14 of the GNSS receiver 10 at block 38. On the other hand, if the average statistical value is greater than the threshold value, the process loops back to block 26, whereupon new values for the parameters of the parametric expression are identified and subsequently used to determine an average statistical cost, as described above. In this regard, the part of the process in blocks 26, 28, 30, 32, and 34 is iterated until an acceptable value of the average statistical cost is found.

As described above, the present invention is applicable to image analysis, such as InSAR, and other imaging techniques that acquire phase data. InSAR is an imaging technique commonly used to determine the geophysical effects of geophysical events, such as a seismic or volcanic event, on a geographic region or area. In conventional InSAR, two separate images of the same area acquired at two different moments in time, e.g., before a geophysical event and after the same geophysical event, and an interferogram is produced from the differences in phase between the two images. INSAR can also be used to measure topographic elevation and produce a digital elevation model. In this case, the two images can be acquired at the same time and the effects of any geophysical events can be neglected. In both cases, the phase difference is measured and recorded as repeating fringes in the interferogram. In conventional InSAR, the repeating fringes must be unwrapped before any useful quantitative analysis can be performed. The present invention, however, allows quantitative analysis to be performed without first unwrapping the repeating fringes of the interferogram.

Figure 4:
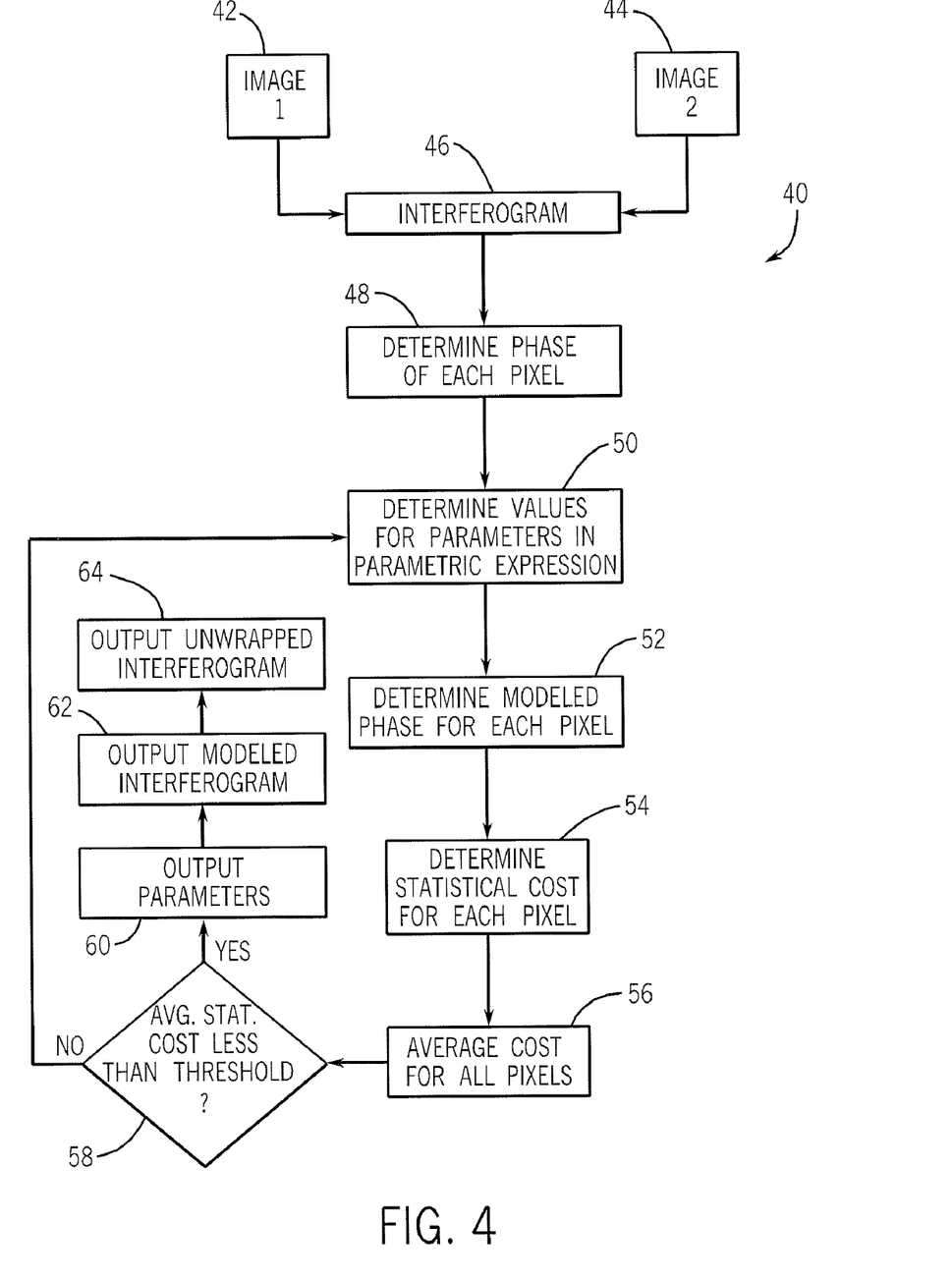
FIG. 4 is a flow chart setting forth the steps of determining the geophysical changes in a geographic area having undergone a geophysical event from a pre-geophysical event image and a post-geophysical event image of the geographic area.

Referring now to FIG. 4, a modified InSAR process 40 according to the present invention begins in a manner similar to conventional InSAR processes. More particularly, two separate images are acquired at block 42 and block 44. To determine the impact of a geophysical event on a region, the image acquired at block 42 will be taken prior to the occurrence of the geophysical event and the image acquired at block 44 will be taken after the occurrence of the geophysical event. From those two images, an interferogram is produced at block 46 in a conventional manner. The interferogram is derived from the phase differences between the two images acquired at block 42 and block 44.

The process 40 continues by measuring the phase of each pixel in a subset of the interferogram in a known manner at block 48. The process 40 then continues to select a set of values for the parameters of a parametric expression describing the geophysical characteristics of the imaged geographic area at block 50. The parametric expression is then solved at block 52 to determine a modeled phase value for each pixel. In block 54, the statistical cost accounts for the residual difference between the observed phase value and the modeled phase value in each pixel. The process 40 then calculates an average statistical cost across all pixels of the interferogram at block 56. The process then determines if the average statistical cost is less than a predefined threshold value at block 58. If so, the process 40 outputs the optimal estimated parameters at block 60. The process may also output a modeled interferogram at block 62 or an unwrapped interferogram at block 64.

For example, for an earthquake, the output may include numerical values for such parameters as slip, length, width, strike, dip, rake, and others associated with fault rupture. The output may also include error bars, cross sections, maps, or other graphical representations showing the change in the various parameters as a result of the geophysical event. The output may also include various images based on the modeled parameters. For example, an image derived from the modeled parameters or an unwrapped version of the wrapped interferogram may be displayed on a suitable monitor (not shown).

On the other hand, if the average cost is greater than the acceptable threshold value, the process 40 loops back to block 50 whereupon new values for the parameters are established and processed as described above. In a preferred embodiment, the process is iterated until parameter values that provide an average cost less than the threshold are determined.

Figure 5:
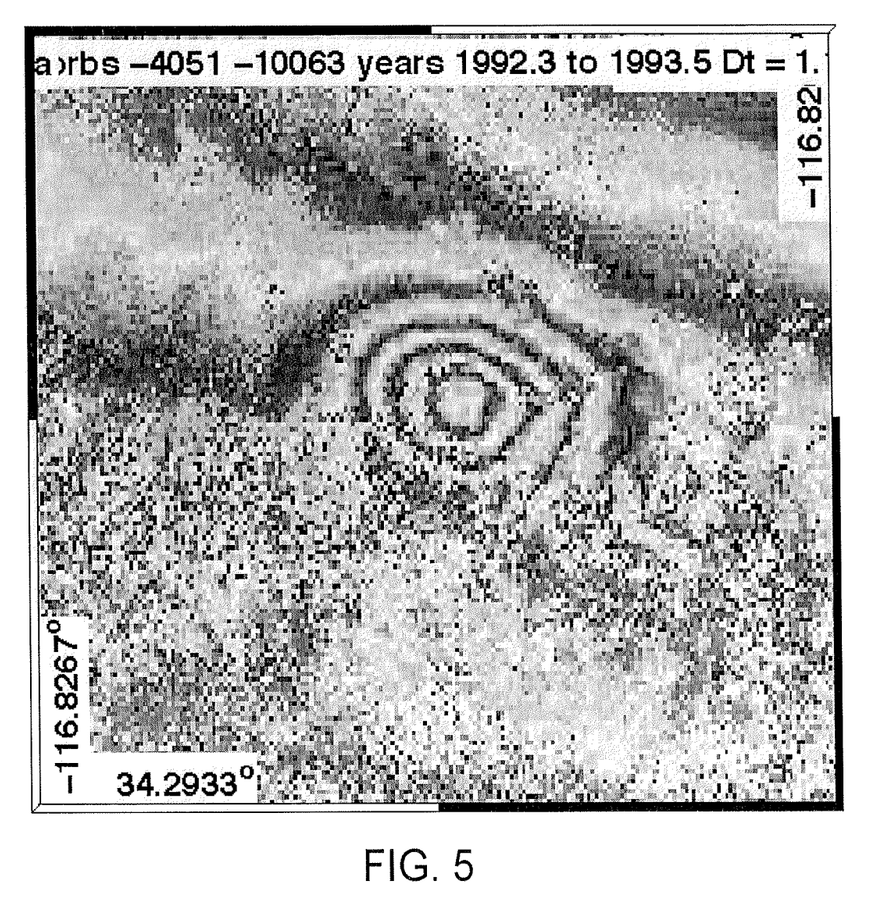
FIG. 5 shows the observed change in phase between one image acquired before a small earthquake and a second image acquired after the earthquake.
Figure 6:
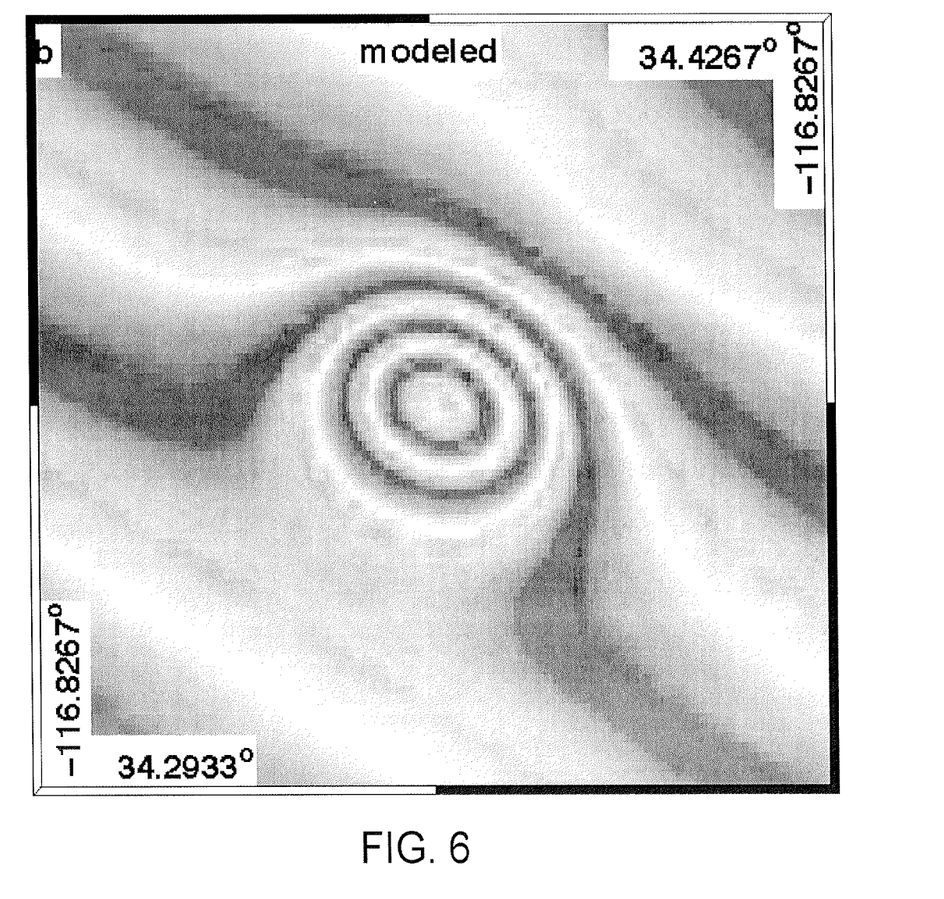
FIG. 6 shows the model phase change calculated from the parameters estimated using a simulated annealing scheme to find an average statistical cost below a predetermined threshold according to the present invention.
Figure 7:
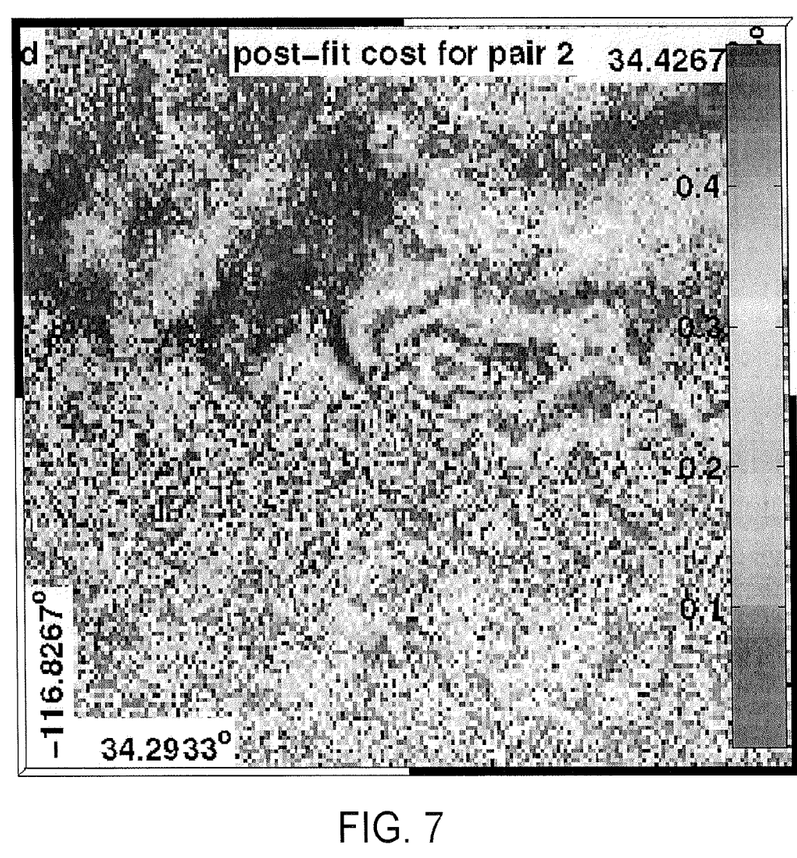
FIG. 7 shows the cost function for each pixel of an interferogram.
Figure 8:
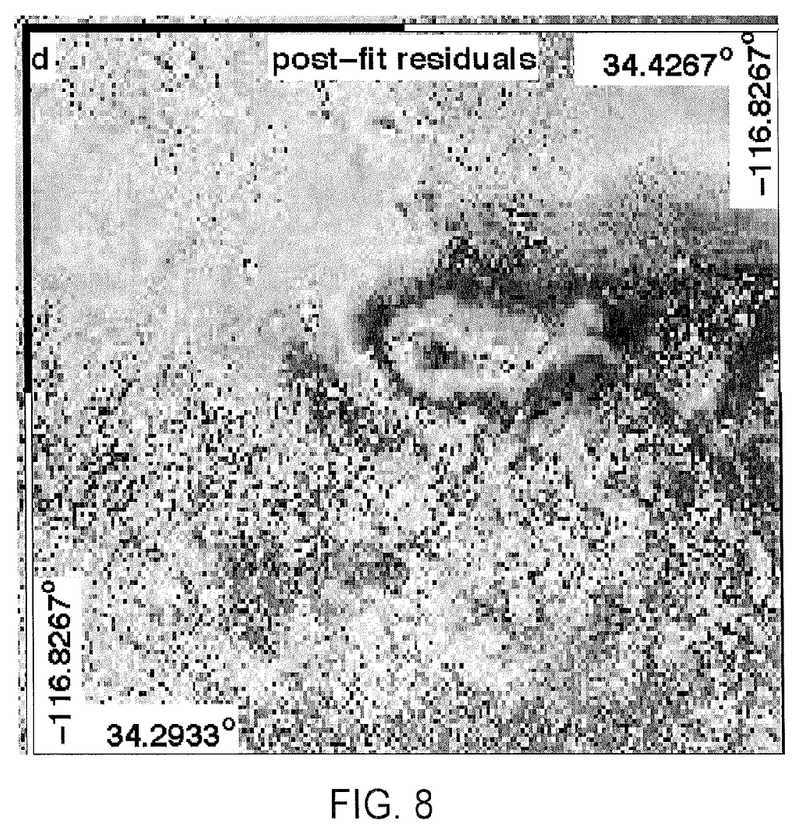
FIG. 8 shows the residual phase values, i.e. the difference between the observed phase values shown in FIG. 5 and the modeled phase values shown in FIG. 6.

FIGS. 5 through 8 comprise several images associated with application of the present invention to determine the impact of a geophysical event. FIG. 5 shows the observed change in phase change between one image acquired before a small earthquake and a second image acquired after the earthquake. The earthquake created a blister approximately 4 km across that raised the topographic surface. The distance between the radar antenna and the ground shortened by approximately 11 centimeters. This resulted in 4 fringes in the observed phase values shown in the interferogram. FIG. 6 shows the model phase change calculated from the parameters estimated using a simulated annealing scheme to minimize the cost function described herein and expressed at Equation 4. FIG. 7 shows the cost function evaluated by setting n=1 in Equation 4 individually at each of 32361 pixels comprising the interferogram. The optimal parameters were found to provide an average cost of 0.22 cycles over 2000 measurements in the data subset. This is a significant improvement over conventional techniques that provided estimates for the parameters that yielded a cost of 0.26 cycles. FIG. 8 shows the residual phase values. In FIGS. 5, 6, and 8, the phase values range from $-\frac{1}{2}$ cycle to $+\frac{1}{2}$ cycle such that each "fringe" corresponds to a change of 28 mm in range between the ground and the satellite.

While the present invention has been described with respect to two specific examples, it is understood that the present invention is also applicable to other image and signal processing systems, such as optical imaging systems, medical imaging systems, as well as data recorded by RADAR sensors, gravimetric sensors, acoustic sensors, seismological sensors, meteorological sensors, and the like. Also, the present invention is applicable to other GNSS embodiments in addition to GPS, such as the GALILEO satellite system and the GLONASS satellite system.

One skilled in the art will appreciate that the present invention allows well-established algorithms, such as simulated annealing that seek the (unique) global minimum in a misfit space that may contain several local minima, to be used. In addition, since the cost function, Equation 4, has the same physical units as the phase data itself, uncertainties in the parameter estimates can be determined using standard statistical techniques, e.g., analysis of variance. This attribute provides a distinct advantage over other techniques that maximize a score, for example, as a function of the length of the sum of the residual phasors, i.e, pixel-by-pixel differences between the measured value of the data phasor and the corresponding modeled value.

Many changes and modifications could be made to the invention without departing from the spirit thereof. The scope of these changes will become apparent from the appended claims.

We claim:
1. A method comprising:
   (a) acquiring a plurality of signals, each having a phase component of observed phase value characterized by a parametric model expression, the parametric model expression defined by a set of parameters of unknown value;
   (b) establishing a set of values for the parameters;
   (c) determining a modeled phase value for each of the phase components by evaluating the parametric expression with the set of values;
   (d) determining a statistical cost for the set of parameter values as a function of a difference between the observed phase value and the modeled phase value of each of the phase components averaged over the plurality of signals;
   (e) repeating (b)-(d) until finding an average statistical cost that is less than a predetermined threshold; and

(f) conveying those values for the parameters corresponding to the parametric expression that provides the desired value of average statistical cost.

2. The method of claim 1 further comprising receiving a user input associated with the signal and establishing an initial set of values for the set of parameters from the user input.

3. The method of claim 2 wherein the plurality of signals is transmitted by the Global Navigation Satellite System (GNSS) and received by a GNSS receiver of unknown position and the set of parameters defines the position of the GNSS receiver.

4. The method of claim 3 wherein the set of parameters includes the latitude coordinate, longitude coordinate, elevation, and time of day.

5. The method of claim 3 wherein the phase component is the carrier phase of the GNSS signal.

6. The method of claim 1 wherein (a) includes acquiring the signal from an interferogram defined from a first image and a second image acquired of a common geographic area and wherein the set of parameters defines geophysical characteristics of the geographic area.

7. The method of claim 6 wherein (f) includes generating a modeled interferogram from a set of values for the parameters corresponding to an acceptable value of average statistical cost.

8. The method of claim 6 wherein (f) includes generating an unwrapped interferogram.

9. The method of claim 6 wherein (a) includes acquiring a plurality of signals from a plurality of images.

10. The method of claim 6 wherein the first image is acquired of a geographic region at a first moment in time and the second image is acquired of the geographic region at a second moment in time, and further comprising displaying a map showing differences in the geographic region associated with a geophysical event occurring between the first moment in time and the second moment in time.

11. The method of claim 10 wherein the geophysical event includes a seismic, volcanic, glacial, landslide, flooding, atmospheric, or meteorological event proximate to the geographic region.

12. The method of claim 10 wherein the geophysical event includes a ground disturbance associated with extraction, injection, or explosion of material proximate to the geographic region.

13. The method of claim 6 wherein the first image is acquired of a geographic region from a first point of view and the second image is acquired of the geographic region from a second point of view, and wherein displaying the map includes showing the topographic elevation in the geographic region.

14. A Global Navigation Satellite System (GNSS) device comprising an antenna, a receiver, a display, and a processor, the processor adapted to execute a set of instructions that cause the processor to:
(a) measure a carrier phase for each of a plurality of GNSS signals acquired by the receiver;
(b) access a stored parametric expression for the carrier phase, the parametric expression defined by a set of parameters;
(c) establish a set of values for the parameters from a combination of user input values and stored values;
(d) calculate a modeled phase for the carrier phase for each of the plurality of GNSS signals from the parametric expression;

(e) calculate a statistical cost of the set of parameter values as a function of the difference between the measured value and the modeled value for each phase component, averaged over the over the plurality of GNSS signals;
(f) repeat (b)-(e) until finding an average statistical cost that is less than a predetermined threshold; and
(g) present, on the display of the GNSS device, the set of parameter values corresponding to the acceptable value of average statistical cost.

15. The GNSS device of claim 14 wherein the set of parameters describes the position of the GNSS device.

16. The GNSS device of claim 14 further comprising a user interface that allows a user to input approximate values for the set of parameters.

17. The GNSS device of claim 16 wherein the processor is further caused to receive a user input and determine initial values for the set of parameters of the parametric expression from the user input.

18. A computer-readable storage medium having a set of instructions stored thereon that when executed by a processor causes the processor to:
(a) determine a phase component for each of a plurality of recorded signals received by a GNSS receiver;
(b) access a stored parametric expression characterizing the phase components, the parametric expression defined by a set of parameters;
(c) establish values for the set of parameters from a combination of user input values and stored values;
(d) calculate a modeled value for each of the phase components from the parametric expression;
(e) calculate an average statistical cost of the set of parameter values as a function of the difference between recorded values and modeled values of each of the phase components averaged over the plurality of signals;
(f) repeat (b)-(e) until finding an acceptable average statistical cost; and
(g) convey the set of parameter values corresponding to the acceptable average statistical cost.

19. The computer readable storage medium of claim 18 wherein the plurality of signals includes GNSS signals.

20. The computer readable storage medium of claim 18 wherein the processor adjusts the values for the set of parameters until the average statistical cost is acceptable.

21. The computer readable storage medium of claim 18 wherein the processor is caused to determine a specific position of the GNSS receiver with an accuracy of better than 1 meter.

22. A computer readable storage medium having a set of instructions stored thereon that when executed by a processor causes the processor to:
(a) acquire a first image and a second image of a geographic area;
(b) generate an interferogram from the first image and the second image;
(c) select a subset of the interferogram;
(d) measure a phase of each pixel of the subset;
(e) determine a parametric expression that characterizes the phase of each pixel of the subset;
(f) determine a statistical cost for parameters of the parametric expression as a function of the phase averaged over the pixels of the subset of pixels;
(g) repeat (e)-(f) until finding an average statistical cost that is less than a predetermined threshold; and at least one of:
(h) convey those values for the parameters corresponding to the parametric expression that provides an average statistical cost that is less than the threshold;

(i) generate a modeled interferogram from those values for the parameters corresponding to the parametric expression that provides an average statistical cost that is less than the threshold value; and (j) unwrap the observed interferogram by using the modeled interferogram generated in (i).

23. The computer readable storage medium of claim 22 wherein the first image is acquired of a geographic region at a first moment in time and the second image is acquired of the geographic region at a second moment in time, and further comprising displaying a map showing changes in the geographic region associated with a geophysical event occurring between the first moment in time and the second moment in time.

24. The computer readable storage medium of claim 22 wherein the first image is acquired of a geographic region in one geometric configuration and the second image is acquired of the geographic region in a second geometric configuration, and wherein the processor is further caused to display a map of topographic elevation in the geographic region.

* * * * *